United States Patent [19]

Kraan

[11] Patent Number: 4,457,567
[45] Date of Patent: Jul. 3, 1984

[54] BUILDING SYSTEM INCLUDING A CONSTRUCTION MEMBER WHICH IS MOVABLE ON TWO GUIDES

[75] Inventor: Arie W. Kraan, Eindhoven, Netherlands

[73] Assignee: U.S. Philips Corporation, New York, N.Y.

[21] Appl. No.: 194,176

[22] Filed: Oct. 6, 1980

Related U.S. Application Data

[63] Continuation of Ser. No. 69,401, Aug. 24, 1979, abandoned.

[30] Foreign Application Priority Data

Aug. 29, 1978 [NL] Netherlands .................. 7808872

[51] Int. Cl.³ ............................................ F16C 29/04
[52] U.S. Cl. .................................................. 308/6 R
[58] Field of Search ................... 308/6 R, 6 B, 6 A, 7, 308/6.1, 3.8

[56] References Cited

U.S. PATENT DOCUMENTS 2,166,409  7/1939  Hull et al. ............................. 308/7
3,622,211  11/1971  Mitton ................................ 308/6 R
3,625,575  12/1971  Darnell .............................. 308/6 R
3,721,967  3/1973  Englert et al. ...................... 308/6
3,749,455  7/1973  Meier ................................. 308/6 R

FOREIGN PATENT DOCUMENTS 7702109  8/1978  Netherlands .

Primary Examiner—Lenard A. Footland
Attorney, Agent, or Firm—Marc D. Schechter

[57] ABSTRACT

A building system including a slide-like construction member which is movable on two guides. The guides are formed by two rods or tubes having a circular cross section. The construction member is formed by two bearing blocks, each of which comprises three ball bearings of the same diameter. The axes of the ball bearings are situated in one plane and are tangent to a circular cylinder having an axis and a constant radius. The shafts of two ball bearings are rigidly connected to the relevant block, while the shaft of the third ball bearing is adjustable with respect to the other two. These two blocks can be interconnected to cooperate with the first one of the rods. The system further comprises a third bearing block which supports two ball bearings of the same diameter, the shafts thereof extending parallel to each other. One ball bearing is rigidly connected to the block, while the other ball bearing is adjustable. The block can cooperate with the second rod and can be rigidly connected to one of the other two blocks.

6 Claims, 5 Drawing Figures

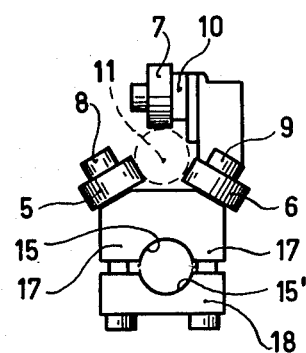
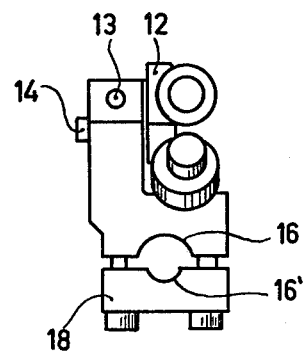
FIG. 2          FIG. 3
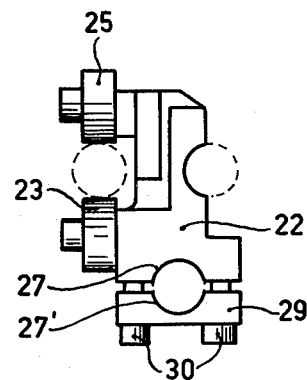
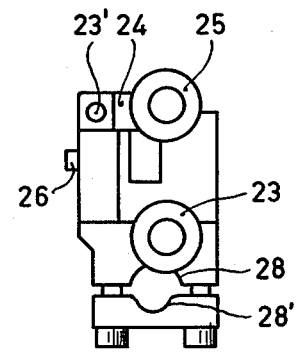
FIG. 4          FIG. 5

BUILDING SYSTEM INCLUDING A CONSTRUCTION MEMBER WHICH IS MOVABLE ON TWO GUIDES

This is a continuation of application Ser. No. 069,401, filed Aug. 24, 1979, abandoned.

BACKGROUND OF THE INVENTION

The invention relates to a building system which includes a slide-like construction member movable on two guides. The invention furthermore relates to a construction member for this building system and to bearing blocks for use therein.

In practice it is often desirable, particularly when prototypes are concerned, to be able to build a structure quickly and in a flexible manner on site and, if such a structure does not satisfy or does not completely satisfy the requirements imposed on it, to be able to modify it at comparatively small expense. For meeting this demand, a number of building systems are commercially available. A building system of such a kind is described in Netherlands Patent Application No. 77 02 109. Using this system, almost any desired prototype of a machine can be manufactured at comparatively low cost. However, the building system described in this Netherlands Patent Application does not enable the manufacture of a structure where a slide-like construction member can move over two guides.

SUMMARY OF THE INVENTION

An object of the invention is to provide a building system which includes a construction member which is movable over two guides.

To this end, the building system according to the invention includes guides, which are formed by two rods or tubes having circular cross-sections, and a construction member. The construction member includes which comprises three ball bearings of the same diameter. The axes of the shafts on which the bearings are mounted are situated in one plane or in parallel planes and are tangent to a circular cylinder having an axis and a constant radius. The shafts of two ball bearings are rigidly connected to the relevant block, while the shaft of the third ball bearing is adjustable with respect to the other two, the two blocks are capable of cooperating in an interconnected manner with the first one of the rods. The system further comprises a third bearing block which supports two ball bearings of the same diameter whose shafts extend parallel to each other. One ball bearing of the third bearing block is ridigly connected to the block while the other ball bearing is adjustable. The third block is adapted to cooperate with the second rod and to be rigidly connected to one of the other two blocks.

Using a building system according to the invention, a guide for a slide can be comparatively simply constructed. A large number of different construction members can be built using a small number of elements of different dimensions. The slide is then guided on the one hand by two bearing blocks with three ball bearings on the one rod while, in order to prevent rotation around this rod, the slide is guided on the other rod by way of a bearing block comprising two ball bearings. In order to allow some adaptation to the rod diameter, one of the ball bearings of each bearing block is adjustable. Thus, the accuracy of the rod dimension is not subject to severe requirements.

BRIEF DESCRIPTION OF THE DRAWINGS

The invention will be described in detail hereinafter with reference to the accompanying diagrammatic drawing.

FIGS. 2 and 3 are side elevation views of a bearing block comprising three ball bearings.

FIGS. 4 and 5 are side elevation views of a bearing block comprising two ball bearings.

DESCRIPTION OF THE PREFERRED EMBODIMENTS

Figure 1:
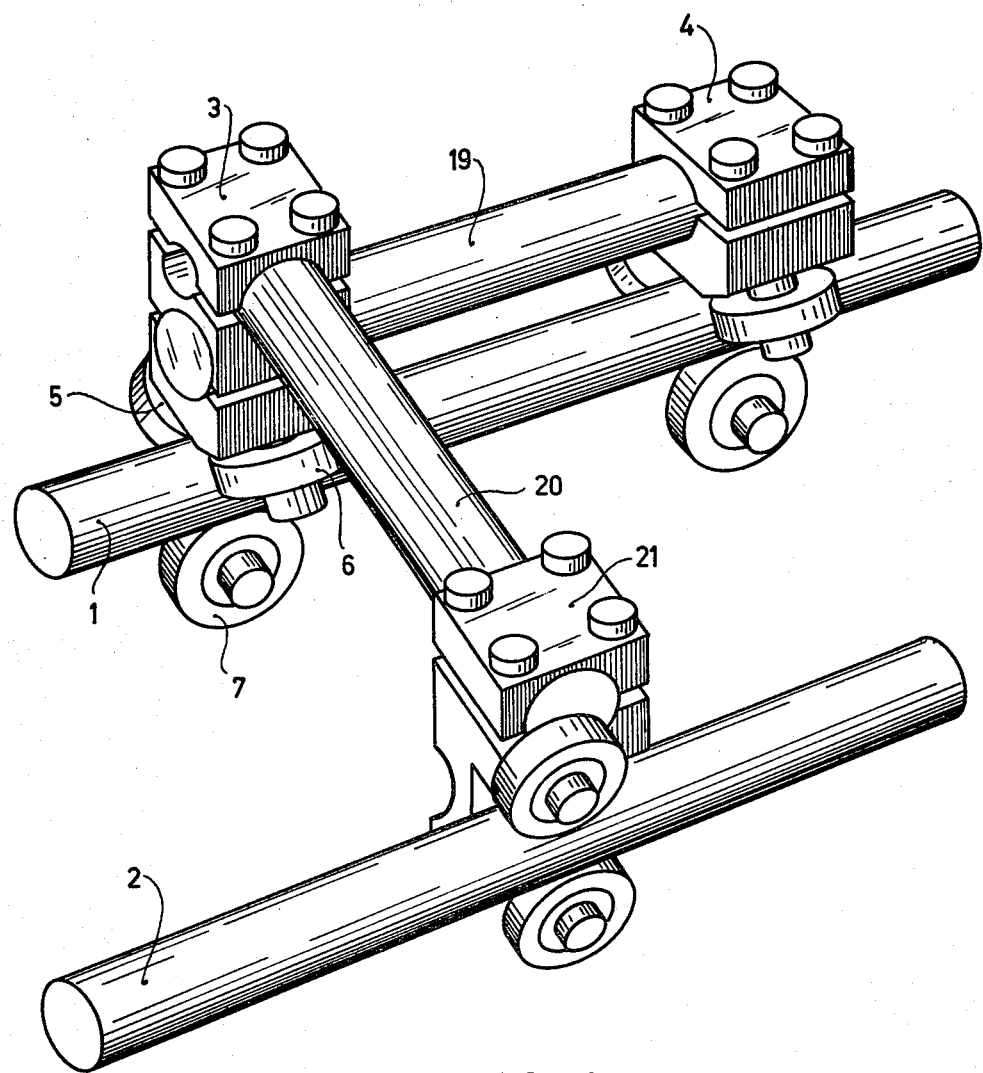
FIG. 1 is a perspective view of a slide-like construction member which is guided on two rods.

The reference numerals 1, 2 in FIG. 1 denote two rods which are rigidly connected (in a manner not shown) to a structure and which are connected to a construction member which slides on the rods. The building system according to the present invention comprises guides and a construction member. The guides are rods 1 and 2, and the slide-like construction member is the remainder of the device pictured in FIG. 1, further described below.

Two bearing blocks 3 and 4 are guided on the rod 1. Each of the bearing blocks comprises three ball bearings 5, 6 and 7 which are connected to the blocks in the manner shown in detail in FIGS. 2 and 3. This figure shows how the axes of rotation 8, 9 and 10 of each of the ball bearings 5, 6, 7 are tangent to a circular cylinder having an axis 11 and a constant radius.

Because all ball bearings have the same diameter, these ball bearings can thus cooperate with a rod (in this case the rod 1) whose axis coincides with the line 11.

In order to facilitate the mounting of the bearing blocks on the rod 1, the ball bearings 7 is connected to an arm 12 of a lever which is pivotable about a shaft 13 which can be adjusted by means of an adjusting screw 14. The ball bearings 5, 6 and 7 can thus be pressed against the rod 1, so that there is no play.

The bearing blocks further comprise two recesses 15 and 16, which mutually perpendicularly intersect each other. The bearing blocks are provided with threaded holes 17, so that a backing plate 18, being provided with corresponding recesses 15' and 16' can be secured against the block by means of bolts. Another rod can then be secured in the recesses 15, 16.

In the construction shown in FIG. 1, the bearing blocks 3, 4 are interconnected by a rod 19 which is clamped in the recesses 15. The block 3 is connected to a bearing block 21 by means of a rod 20 which is clamped in the recess 16.

Bearing block 21 has a construction as shown in FIGS. 4 and 5 and consists of a basic section 22 in which a first ball bearing 23 is connected. An arm 24 is connected to the basic section 22 so as to be pivotable about a shaft 23', a second ball bearing 25 being connected to the arm 24. The arrangement of the ball bearings 23 and 25 is such that the axes of rotation are situated in parallel planes in the operating condition. Using the adjusting screw 26, the arm 24 with the ball bearing 25 can be adjusted and pressed against a rod present between the ball bearings, for example the rod 2 in FIG. 1.

The basic section 22 comprises two recesses 27 and 28 which extend at right angles with respect to each other and which are adapted to cooperate with corresponding recesses 27' and 28' in a backing plate 29 which can be bolted to the basic section by means of bolts 30. The connection rod 20 is clamped in recesses 28, 28' and thus forms a rigid connection to the bearing block 3.

Thus, a construction member is formed, from bearing blocks 3, 4, and 21 and rods 19 and 20, which is accurately guided on the rods 1 and 2.

A large number of construction members can be manufactured by using a number of these blocks of different dimensions and rods or tubes of corresponding dimensions.

What is claimed is:

1. A building system including two guides and a slide-like construction member which is movable on the guides, characterized in that the guides are formed by two rods or tubes having a circular cross-section and the slide-like construction member comprises:

two bearing blocks, each of which comprising three shafts, each shaft having an axis, and three ball bearings of the same diameter, one ball bearing mounted on each shaft, the axes of the shafts being situated in one plane or in parallel planes and being tangent to a circular cylinder having an axis and a constant radius, two of the shafts of each block being rigidly fixed relative to each other while the remaining shaft of each block is adjustable with respect to the other two, the two blocks being capable of cooperating in an interconnected manner with one of said rods; and a third bearing block comprising two shafts, each shaft having an axis, and two ball bearings of the same diameter, one ball bearing mounted on each shaft, the axes of the shafts extending parallel to each other, one shaft being adjustable with respect to the other shaft, said block being capable of cooperating with the other rod and of being rigidly connected to one of the other two blocks.

2. A bearing block comprising three ball bearings of the same diameter and three shafts, each shaft having an axis, the axes of the shafts being situated in one plane or in parallel planes and being tangent to a circular cylinder having an axis and a constant radius, one ball bearing mounted on each shaft, two of the shafts being rapidly fixed relative to each other, while the remaining shaft is adjustable with respect to the other two.

3. A bearing block as claimed in claim 2, characterized in that the third ball bearing is connected to an arm of a lever which is pivotable about a shaft journalled in the block and which can be adjusted by means of fixing means.

4. A bearing block comprising two ball bearings of the same diameter and two shafts, each shaft having an axis, the axes of the shafts extending parallel to each other, one ball bearing mounted on each shaft, said ball bearings being substantially coplanar in a plane perpendicular to the shaft axes, one shaft being adjustable with respect to the other shaft.

5. A bearing block as claimed in claim 4, characterized in that the adjustable ball bearing is connected to an arm of a lever which is pivotable about a shaft journalled in the block and which can be adjusted by means of fixing means.

6. A slide-like construction member which is movable on two rods, comprising:

two bearing blocks, each of which comprising three shafts, each shaft having an axis, and three ball bearings of the same diameter, one ball bearing mounted on each shaft, the axes of the shafts being situated in one plane or in parallel planes and being tangent to a circular cylinder having an axis and a constant radius, two of the shafts of each block being rigidly fixed relative to each other while the remaining shaft of each block is adjustable with respect to the other two, the two blocks being capable of cooperating in an interconnected manner with one of said rods; and a third bearing block comprising two shafts, each shaft having an axis, and two ball bearings of the same diameter, one ball bearing mounted on each shaft, the axes of the shafts extending parallel to each other, one shaft being adjustable with respect to the other shaft, said block being capable of cooperating with the other rod and of being rigidly connected to one of the other two blocks.

* * * * *

UNITED STATES PATENT AND TRADEMARK OFFICE
CERTIFICATE OF CORRECTION

PATENT NO. : 4,457,567
DATED : July 3, 1984
INVENTOR(S) : ARIE W. KRAAN

It is certified that error appears in the above-identified patent and that said Letters Patent is hereby corrected as shown below:

In the claims:

Claim 2, line 6 (column 3, line 42), change "rap-" to --rigidly--;

Claim 2, line 7 (column 4, line 1), delete "idly".

Signed and Sealed this

Thirtieth Day of October 1984

[SEAL]

Attest:

Attesting Officer

GERALD J. MOSSINGHOFF

Commissioner of Patents and Trademarks